Figure 1:
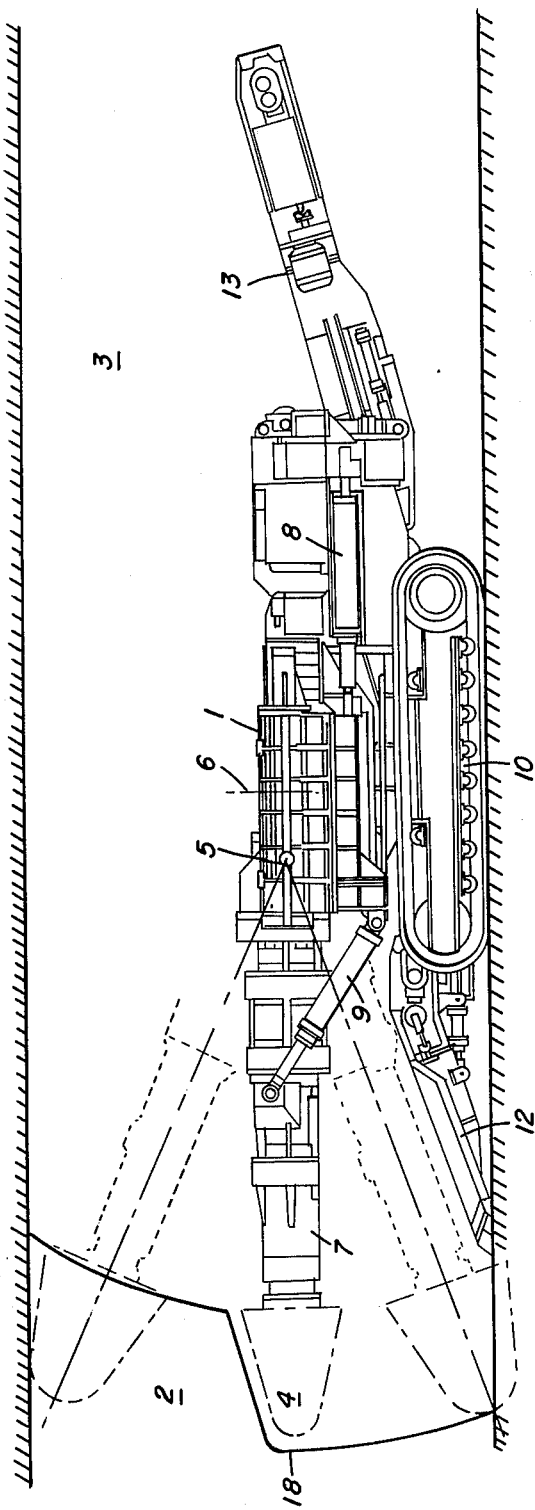

United States Patent [19]

Dinkelbach

[11] 4,033,626
[45] July 5, 1977

[54] METHOD AND APPARATUS FOR CONTROLLING A TUNNELING MACHINE

[75] Inventor: Anton Dinkelbach, Gelsenkirchen, Germany

[73] Assignee: Gebr. Eickhoff, Maschinenfabrik und Eisengiesserei m.b.H., Bochum, Germany

[22] Filed: July 12, 1976

[21] Appl. No.: 704,311

[30] Foreign Application Priority Data

July 16, 1975  Germany .......................... 2531759

[52] U.S. Cl. ...................................... 299/1; 175/45
[51] Int. Cl.² ............................................ E21D 9/10
[58] Field of Search ......................................... 299/1

[56] References Cited

FOREIGN PATENTS OR APPLICATIONS

| | | |
|---|---|---|
| 2,416,947 | 10/1975 | Germany ............................... 299/1 |
| 2,427,816 | 2/1976 | Germany ............................... 299/1 |
| 1,340,772 | 12/1973 | United Kingdom .................... 299/1 |

Primary Examiner—Ernest R. Purser
Attorney, Agent, or Firm—Brown, Murray, Flick & Peckham

[57] ABSTRACT

The displacement of a cutting tool carried by a pivot arm for universal movement on a tunneling machine is controlled to produce a tunnel having a desired profile by producing position signals representing a measured set of perpendicularly-related pivot angles corresponding to the relative position of the cutting tool with respect to the central axis of the tunneling machine when located at a set-point position at the heading face of the tunnel. Second position signals are generated after anchoring the tunneling machine and/or after a plunge cut by the cutting tool into the heading face. A computer coupled to a store or a scanner for a template shaped to correspond to the desired tunnel profile provides signals to represent set-point values of a desired tunnel profile. The first and second signals are generated when a laser detector is moved by the pivot arm into an impinging position by a laser beam which is projected along in a direction parallel with the desired tunnel heading toward the heading face. After the cutting tool is plunged into the heading face and before cutting along a course of travel, the first and second position signals are compared to obtain deviation signals which are used to modify the signals representing the set-point values of a desired tunnel profile while releasing material from the tunnel heading face.

9 Claims, 3 Drawing Figures

METHOD AND APPARATUS FOR CONTROLLING A TUNNELING MACHINE

BACKGROUND OF THE INVENTION

The present invention relates to a method and apparatus to control the traversing motion of a cutting tool supported by an arm that is carried for universal movement by a tunneling machine, particularly a strip-cutting heading machine. More particularly, the present invention relates to such a control for limiting the traversing motion of a cutting tool to the tunnel cross section that is to be driven; the position of the cutting tool is defined in relation to a laser beam projected along in a direction parallel with the desired tunnel axis, and the arm pivoting angles are measured to form corresponding signals while profile control means form signals representing set-point values which are corrected by corresponding signals when the heading machine deviates from its set-point position.

It is a known prior art method to limit traversing motion of a cutting tool while supported for universal movement by a pivot arm on a strip-cutting heading machine to a tunnel cross section that is to be driven wherein the method includes the use of a laser beam projected along the longitudinal tunnel axis for defining the relative position of the tunnel cross section. The range of movement by the cutting tool is limited by using a template which is geometrically similar to the desired tunnel cross section and in which the heading is to proceed. The template is traced by a stop abutment or by a reflective light barrier to form set-point coordinate values for the cutting tool. THe coordinate set-point values are corrected by deviation signals corresponding to deviations by the heading machine from its set-point position.

It has also been disclosed in the past, in regard to a strip-cutting heading machine with a cutting tool supported by a pivot arm to limit the range of universal displacement by the cutting tool to the tunnel cross section relative to a laser beam projected along the longitudinal axis of the tunnel. Such a heading machine is provided with means for detecting offsets and deviations with respect to the laser beam to thereby produce signals which are proportional to the deviations and/or offsets in order to correct the range of permissible movement by the cutting tool. A computer is used to continuously calculate limit coordinates at right angles to measured coordinates which extend through the point of intersection of the cutting tool. In this control system, a mathematical program defines the shape and size of the desired tunnel profile. A signal, proportional to the measured value coordinate of the cutting tool and corrected in accordance with any correction signals which occur, is used to define a point lying in the middle of the position of the cutting tool. This point is tangent to the tunnel profile. The limiting coordinate is constantly compared by the computer with other measured value coordinates of the cutting tool and any motion of the cutting tool beyond the calculated limit value is thus prevented.

SUMMARY OF THE INVENTION

It is an object of the present invention to limit the range of pivotal motion by a universal pivot arm carrying a cutting tool which is, in turn, supported by a tunneling machine, particularly a strip-cutting heading machine; the range of pivotal motion being limited to the desired tunnel cross section and defined in relation to a laser beam independently of the position of the tunneling machine.

Specifically, according to the present invention, there is provided a method for controlling the displacement of a cutting tool by a pivot arm supported for universal movement, upon a tunneling machine, the tunneling machine including means for displacing the cutting tool along a course of travel to form a tunnel having a desired profile by releasing material from the tunnel heading face, the method including the steps of projecting a laser beam in a direction parallel with the desired tunnel heading toward the heading face of the tunnel, moving the tunneling machine into a set-point position adjacent the heading face of the tunnel, displacing said pivot arm to move a laser detector supported thereby into a position for impingement by the laser beam while the tunneling machine remains at the set-point position, generating a first set of signals corresponding to a measured set of pivot angles representing the pivoted position of the pivot arm with respect to the set-point position of the tunneling machine, effecting a plunge cut by the cutting tool into the heading face of the tunnel, thereafter again displacing the pivot arm to move the laser detector into a position for impingement by the laser beam, generating a second set of signals corresponding to a second measured set of pivot angles of the pivot arm after effecting the plunge cut, generating control signals corresponding to set-point values of a desired tunnel profile, comparing the first set of signals with the second set of signals to obtain deviation signals corresponding to a position change by the tunneling machine from the set-point position, and modifying the control signals with the deviation signals for controlling displacement of the cutting tool within a course of travel while releasing material from the heading face of the tunnel.

The apparatus of the present invention includes the combination of means for generating position signals to represent a measured set of pivot angles corresponding to the relative position of a cutting tool with respect to a set-point position of the tunneling machine at the heading face of the tunnel, means for generating set-point signals representing set-point values of a desired tunnel profile produced by profile control means, means for projecting a laser beam in a direction parallel with the desired tunnel heading toward the heading face of the tunnel, laser detector means carried by the pivot arm in a manner for movement thereby into a position for impingement with the laser beam to obtain deviation signals corresponding to a position change of the tunneling machine from the set-point position after completing a plunge cut in the heading face, and comparator means receiving the first position signals for producing a deviation signal corresponding to a position change of the tunneling machine from the set-point position after a plunge cut, the comparator means modifying the set-point signals in response to the deviation signal.

Thus, the present invention provides that a laser detector or marker located at the outer end of the pivot arm, is brought into coincidence with the laser beam prior to each pull, i.e., release of material in a strip-like fashion from the tunnel heading face. More particularly, the marker or laser detector is brought into coincidence with the laser beam after plunging the cutting tool into the drift face and/or after anchoring the strip-cutting machine. Measured value signals proportional to the pivot angles of the tool support arm are compared with a set of corresponding signals representing pivot arm angles produced when the machine is in the set-point position and the marker is located in an impinging relation with the laser beam. Difference signals are produced and used to correct the set-point signals from profile control means while cutting along a pull in the heading face of the tunnel.

All deviations to the position of the strip-cutting heading machine can be detected by the method and apparatus of the present invention because the marker or laser detector on the pivot arm is brought into coincidence with the laser beam. When the horizontal and/or vertical pivot angle of the pivot arm assumes a value which is different when compared to the corresponding pivot angles obtained with respect to the set-point position of the machine, the angular difference between the two positions of the machine, therefore, represents a measure of the deviation by the machine. This deviation is used during the subsequent pull as a correction signal for angle set points of the pivot arm. The angle set points are provided by the profile control means. The method and apparatus of the present invention alleviate the need for special devices and apparatus for determining the existence and size of any deviations to the position of the heading machine.

Figure 2:
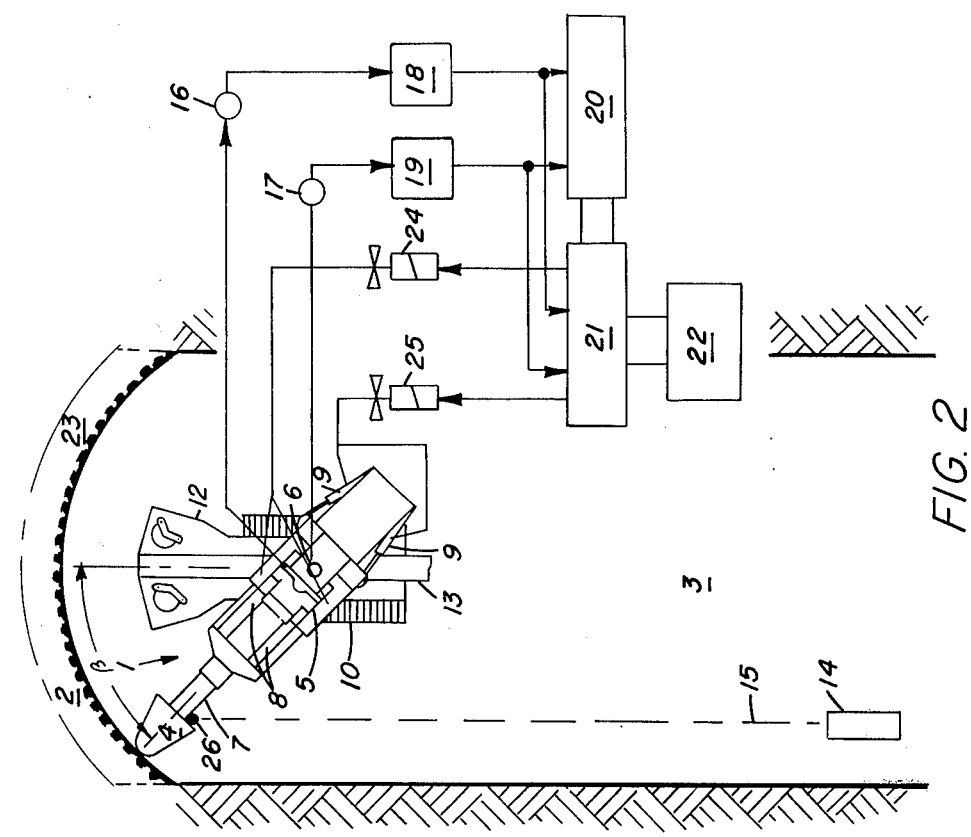
Figure 3:
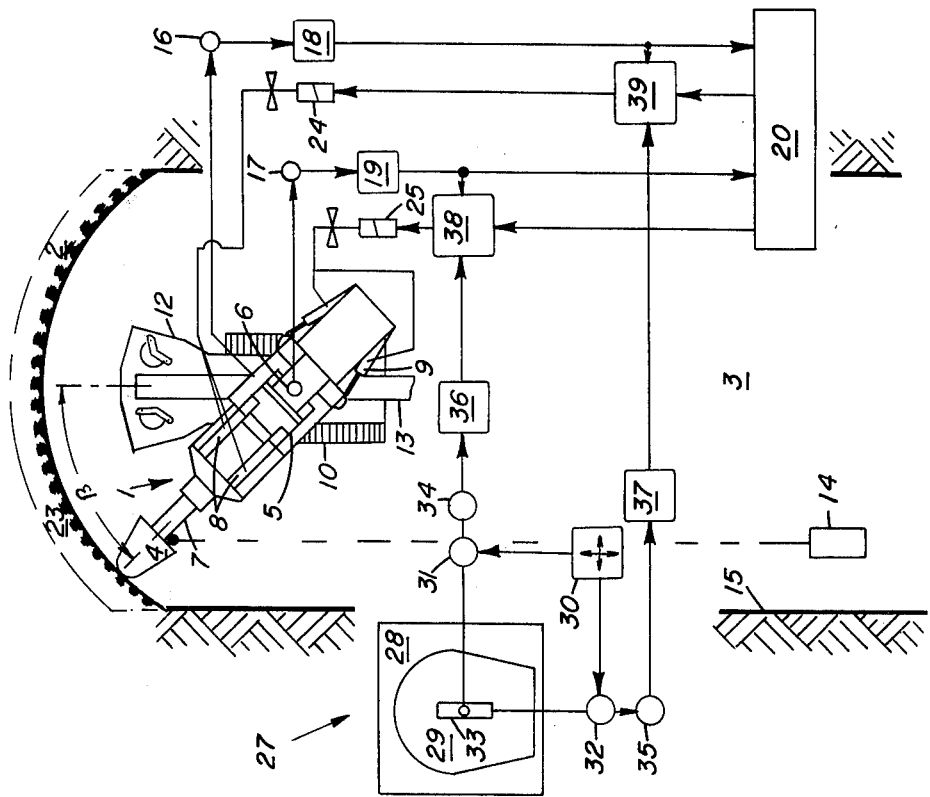

According to a further feature of the present invention, the method is performed by the use of a correction store having inputs which are connected to transducers employed to produce signals corresponding to the measured values of the pivot angles by the pivot arm. The outputs from the correction store are connected with profile control elements which form the set-point values. These features and advantages of the present invention as well as others will be more fully understood when the following description is read in light of the accompanying drawings, in which:

FIG. 1 is a side elevational view of a strip-cutting heading machine for use with the control method and apparatus of the present invention;

FIG. 2 is a plan view of the heading machine shown in FIG. 1 together with a circuit diagram according to one embodiment of the invention; and FIG. 3 is a view similar to FIG. 2 but illustrating a circuit diagram according to another embodiment of the invention. In FIGS. 1–3, a strip-cutting heading machine 1 is employed to work a heading face or drift face 2 of a tunnel 3 which is to be driven by means of a cutting drum 4 supported by a pivot arm 7. The arm 7 is supported by the frame of machine 1 for universal pivotal movement about a horizontal axis 5 and a vertical axis 6. Double-acting piston and cylinder assemblies 8 and 9 are used to pivotally displace the arm 7 and thereby the cutting drum 4 to release material from the heading face of the tunnel. The strip-cutting heading machine 1 is traversed along the tunnel floor by a track gear 10. A shovel loader 12 carried by the machine 1 takes up the debris formed by the release of material from the heading face and a conveyor 13 on the machine delivers the debris to the rear of the machine. A laser transmitter 14 is situated within the tunnel 3 at a position to project a laser beam 15 in the working direction for the strip-cutting heading machine 1. More particularly, the laser beam 15 from the laser transmitter 14 is geodetically aligned to project in a direction which is parallel to the longitudinal axis of the tunnel 3 which is to be driven.

Pivotal movement by the support arm 7 is detected by angle encoders or transmitters 16 and 17 which produce output signals proportional to the displacements of the pivot arm about axes 5 and 6. The output signals from encoders 16 and 17 are passed through amplifiers 18 and 19, respectively. In accordance with the embodiment of the present invention illustrated in FIG. 2, the output signals from amplifiers 18 and 19 are passed into a correction store 20. A store 22 supplies to a computer 21, all profile data representing the desired profile of the tunnel to be formed. The date supplied by store 22 is a mathematical function representing the desired tunnel profile or mathematical functions of individual profile sections as well as profile radii which define the profile dimensions and the coordinates of the radii centers so that the computer 21 is enabled to allocate the appropriate set-point signal to the appropriate measured value signal by means of the data supplied thereto. The store 22 may also supply a program for the actual cutting operation and thus defines the path of displacement for the cutting drum 4 when a pull 23 is cut from the drift or tunnel face. It is to be understood that manual control means, not shown, are provided for the operator of the heading machine 1 to controllably cause movement of the arm 7 at random over the entire cross section of the drift face for the purpose of cutting the pull 23. In both instances, i.e., when the arm 7 is controlled by computer 21 or by manual control, electrohydraulic control elements 24 and 25 are used to control the operation of the piston and cylinder assemblies 8 and 9 to bring about the corresponding positioning of the arm 7.

The function of the computer 21 is confined to limiting the range of pivotal movement of arm 7 when manual control is applied so as to prevent movement of the cutting drum 4 beyond the desired profile of the tunnel 3 which is to be driven.

Conveniently, the cutting drum 4, which forms a cutting tool, is first plunged into the drift face 2 prior to cutting the pull 23. When appropriate, the strip-cutting heading machine 1 is firmly stressed or anchored within the tunnel 3 during the plunge cut. The pivot arm 7 is then moved into a position in which a marker or laser detector 26 situated at the outermost end of the arm and closely adjacent the cutting tool 4, is positioned accurately for impingement by the laser beam 15. The signals from the angle encoders 16 and 17 correspond to a measured value of the pivot arm angles $\alpha$ and $\beta$ and supplied as output signals from amplifiers 18 and 19, respectively, to the correction store 20 where these signals are compared with a set of corresponding signals stored thereby and representing the set-point position of the tunneling machine. The stored set-point signals also correspond to pivot arm angles $\alpha$ and $\beta$ that were measured when the heading machine 1 was located in a set-point position prior to the plunge cut and after the laser detector 26 was moved into an impinging relation with the laser beam. The set-point signals and the measured value signals are compared in the store 20 to determine deviation signals prior to commencement of the actual heading operation. The deviation signals are, therefore, a measure of the deviation of the heading machine 1 from its set-point position. According to the present invention, the deviation signals corresponding to the machine deviation are used to correct the set-point signals in the computer 21 when the pull 23 is cut. The two outputs from the correction store 20 are connected to the computer 21 which is, therefore, supplied not only with the measured value signals of the pivot arm angles $\alpha$ and $\beta$ but also constantly supplied with the correction signals from store 20. The computer 21 forms two set-point signals which are used to control the operation of two electrohydraulic control elements 24 and 25 by means of the measured value signals supplied from the angle encoders 16 and 17 and passed through the respective amplifiers 18 and 19 as well as by means of correction signals from the correction store 20. The set-point signals are used to control the piston and cylinder assemblies 8 and 9 to maintain the cutting drum 4 within the desired tunnel cross section as defined in relation to the laser beam 15. Manual control operation of the piston and cylinder assemblies 8 and 9 is restricted to movements of the cutting drum 4 only within the desired tunnel cross section to be driven by controlling the electrohydraulic control elements 24 and 25. As illustrated in FIGS. 2 and 3, the pivot arm angles $\alpha$ and $\beta$ correspond to the vertical and horizontal perpendicular angular displacements of the pivot arm from a position coinciding with the longitudinal central axis of the tunneling machine.

In the embodiment of the present invention illustrated in FIG. 3, the strip-cutting heading machine 1 incorporates an indicating device 27 having a surface 28 which defines, at a reduced scale, the profile of the desired tunnel cross section through the use of a template 29 or a drawing. A reflective light barrier 33 which can be moved by manual control means 30 (such as a joystick control) is connected to two servomotors 31 and 32 over the entire surface 28 to thereby trace the outline or profile of the template. Angle encoders 34 and 35 deliver their output signals to amplifiers 36 and 37, respectively to provide signals corresponding to the distance traversed by the operation of the two servomotors 31 and 32 to move the reflective light barrier. In this way, the reflective light barrier is used to produce signals which correspond to the coordinates of the reflective light barrier and supplied by the outputs from amplifies 36 and 37 to differrential amplifiers 38 and 39, respectively, to form the set-point coordinates of the cutting drum. The electrohydraulic control elements 24 and 25 respond to the outputs from the differential amplifies 39 and 38 to control the position of the cutting drum 4 along the drift face 2 so as to correspond to the position of the reflective light barrier 33 on the template 29. The cutting drum 4, therefore, always follows the guided movement of the reflective light barrier 33 by an operator through the use of the manually-operated control means 30 used to guide the barrier along the template surface. The cutting drum 4 is caused to move to release material from the heading face of the tunnel which has a cross section that is similar to the template profile but larger. The measured value signals corresponding to the pivot arm angles $\alpha$ and $\beta$ are formed by the two angle encoders 16 and 17 which detect the associated pivotal motion about pivot axes 5 and 6. The output signals from encoders 16 and 17 are supplied by way of amplifiers 18 and 19, respectively, to the correction store 20 and to differential amplifiers 38 and 39. The output signals from differential amplifiers 38 and 39 corresponds to the deviations between the set-point values and the measured values. The output signals from differential amplifies 38 and 39 are used to control the operation of the electrohydraulic control elements 24 and 25, respectively, to thereby move the cutting drum 4 while compensating for deviation between the set-point value and measured value.

According to the embodiment of the present invention illustrated in FIG. 3, the correction store 20 also contains set-point signals which correspond to the pivot arm angles $\alpha$ and $\beta$ measured when the strip-cutting heading machine 1 is in the set-point position and the laser detector 26 is moved into an impinging position with the laser beam 15.

After the cutting drum 4 has been plunged into the drift face 2, the arm 7 is moved into a position in which the laser detector 26 is impinged by the laser beam 15. It will be understood, of course, that the strip-cutting heading machine 1 is either free-standing or anchored into a stressed position within the tunnel when the laser detector is moved for impingement with the laser beam. If the correction store detects a difference between the set-point value and measure value signals to the pivot arm angles $\alpha$ and $\beta$ which occur at the two previously-described times, then the resultant signal differences are proportional to the deviation by the heading machine 1 from its set-point position.

The deviation, thus obtained, is supplied as correction signals to the two differential amplifiers 38 and 39 to modify the output signals thereof which, in turn, are used to control the operation of the electrohydraulic control elements 24 and 25.

A new correction signal in the store is obtained prior to cutting of a pull in both embodiments. After the pull 23 of the drift face 2 has been cut and the strip-cutting heading machine 1, together with its cutting drum 4, have been moved to a position in front of a new drift face 2 or the cutting drum 4 has been plunged into the drift face, the laser detector 26 is again brought into inpingement with the laser beam 15. A continuous transition between individual tunnel pulls 23 is thus achieved and the desired tunnel cross section is maintained accurately in accordance with the set-point position of the tunneling machine which is defined in relation to the laser beam 15. It will be understood, of course, that analog output signals supplied from potentiometers may be employed instead of the angle encoders previously described in regard to both embodiments for determining the measured values of the pivot arm angles $\alpha$ and $\beta$.

Although the invention has been shown in connection with certain specific embodiments, it will be readily apparent to those skilled in the art that various changes in form and arrangement of parts may be made to suit requirements without departing from the spirit and scope of the invention.

I claim as my invention:

1. A method for controlling the displacement of a cutting tool by a pivot arm supported for universal movement upon a tunneling machine, said tunneling machine including means for displacing said cutting tool along a course of travel to form a tunnel having a desired profile by releasing material from the tunnel heading face, said method including the steps of:

projecting a laser beam in a direction parallel with the desired tunnel heading toward the heading face of the tunnel, moving the tunneling machine into a set-point position adjacent the heading face of the tunnel, displacing said pivot arm to move a lser detector supported thereby into a position for impingement by the laser beam while the tunneling machine remains at said set-point position, generating a first set of signals corresponding to a measured set of pivot angles representing the pivoted position of the pivot arm with respect to said set-point position of the tunneling machine, effecting a plunge cut by said cutting tool into the heading face of the tunnel, thereafter again displacing said pivot arm to move said laser detector into a position for impingement by the laser beam, generating a second set of signals corresponding to a second measured set of pivot angles of said pivot arm after effecting said plunge cut, generating control signals corresponding to set-point values of a desired tunnel profile, comparing said first set of signals with said second set of signals to obtain deviation signals corresponding to a position change by the tunneling machine from said set-point position, and modifying said control signals with said deviation signals for controlling displacement of said cutting tool within a course of travel while releasing material from the heading face of the tunnel.

2. The method according to claim 1 including the further step of anchoring said tunneling machine within the tunnel after said generating said first set of signals but before said generating said second set of signals.

3. The method according to claim 1 including the further step of arranging said laser detector at a closely-spaced relation from said cutting tool upon said pivot arm.

4. The method according to claim 1 wherein said first set of signals further corresponds to a set of measured perpendicular displacement angles of said pivot arm with respect to a position coinciding with an axis extending along the tunneling machine.

5. The method according to claim 1 wherein said second set of signals further corresponds to a set of measured perpendicular displacement angles of said pivot arm with respect to a position coinciding with an axis extending along the tunneling machine.

6. The method according to claim 1 wherein said control signals are further defined to include sets of predetermined pivot displacement signals corresponding to sets of coordinate points at the outer periphery of a desired tunnel profile.

7. The method according to claim 1 including the further steps of storing said control signals prior to said step of comparing said first set of signals with said second set of signals, and using the modified control signals to control displacements of said cutting tool.

8. Apparatus to control the displacement of a cutting tool by a pivot arm supported for universal movement upon a tunneling machine, said tunneling machine including means for displacing the cutting tool along a course of travel to form a tunnel having a desired profile by releasing material from the tunnel heading face, said apparatus including the combination of:

means for projecting a laser beam in a direction parallel with the desired tunnel heading toward the heading face of the tunnel, laser detector means carried by said pivot arm in a manner for movement thereby into position for impingement by the laser beam at the heading face, means for generating position signals to represent a measured set of pivot angles corresponding to the relative angular position of the cutting tool with respect to the position of the tunneling machine at the heading face of the tunnel, said position signals being generated when the laser beam impinges upon said laser detector before displacement of the cutting tool to release material from the heading face of the tunnel, means for generating set-point signals corresponding to set points along a desired tunnel profile, and comparator means receiving said position signals and said set-point signals for producing a deviation signal corresponding to a position change of the tunneling machine from the set-point position when the laser beam impinges upon said laser detector means, said comparator means modifying said set-point signals in response to said deviation signals, 9. The apparatus according to claim 8 further comrising store means receiving said position signals and said set-point signals for supplying the same to said comparator means.

* * * * *